(12) United States Patent
Wu et al.

(10) Patent No.: US 8,960,021 B2
(45) Date of Patent: Feb. 24, 2015

(54) NON-CONTACT TYPE TORQUE AND ANGLE OF ROTATION SENSING DEVICE AND MEASUREMENT METHOD USING SAME

(71) Applicants: Giant Electric Vehicle Kunshan Co., Ltd., Kunshan Jiang Su (CN); National Yunlin University of Science and Technology, Douliou, Yunlin (TW)

(72) Inventors: Shang-Teh Wu, Changhua (TW); Szu-Hsien Wu, Taipei (TW); Yi-Chang Wu, Tainan (TW)

(73) Assignees: Giant Electric Vehicle Kunshan Co., Ltd., Kunshan Jiang Su (CN); National Yunlin University of Science and Technology, Yunlin (TW)

( * ) Notice: Subject to any disclaimer, the term of this patent is extended or adjusted under 35 U.S.C. 154(b) by 32 days.

(21) Appl. No.: 13/667,613

(22) Filed: Nov. 2, 2012

(65) Prior Publication Data
US 2014/0053661 A1 Feb. 27, 2014

(30) Foreign Application Priority Data

Aug. 23, 2012 (TW) .............................. 101130685 A (51) Int. Cl.
*G01L 3/02* (2006.01)
(52) U.S. Cl.
USPC .................................................. 73/862.333
(58) Field of Classification Search
CPC ........... G01L 3/109; G01P 3/46; G01P 3/487; G01C 22/002

USPC ....................................... 73/862.331–862.335
See application file for complete search history.

(56) References Cited

U.S. PATENT DOCUMENTS

| 5,031,455 | A | * | 7/1991 | Cline | 73/379.01 |
|---|---|---|---|---|---|
| 5,065,633 | A | * | 11/1991 | Mercat | 73/862.326 |
| 5,177,432 | A | * | 1/1993 | Waterhouse et al. | 324/166 |
| 5,880,585 | A | * | 3/1999 | Oguro | 324/174 |
| 6,513,395 | B1 | * | 2/2003 | Jones | 73/862.333 |
| 6,644,135 | B1 | | 11/2003 | Kishimoto et al. | |

* cited by examiner

*Primary Examiner* — Max Noori
(74) *Attorney, Agent, or Firm* — Muncy, Geissler, Olds & Lowe, P.C.

(57) ABSTRACT

A non-contact type torque and angle of rotation sensing device consisting of a magnetic member, sensing members and a computing unit for measuring a torque being applied to rotate a transmission member and the angle of rotation of said transmission member in a first axial direction is disclosed. The magnetic member defines a first center, and is mounted on and rotatable with the transmission member. The magnetic member deflects relative to the transmission member in a nonparallel manner relative to the first axial direction when rotating with the transmission member. Sensing members induce a magnetic field variation to output respective electrical signals that exhibit a phase difference there between. The computing unit receives and calculates the electrical signals of the sensing member to obtain the amplitude and to further translate the amplitude into torque value and angle of rotation.

7 Claims, 6 Drawing Sheets

NON-CONTACT TYPE TORQUE AND ANGLE OF ROTATION SENSING DEVICE AND MEASUREMENT METHOD USING SAME

BACKGROUND OF THE INVENTION

1. Field of the Invention

The present invention relates to torque sensing technology and more particularly, to a non-contact type torque and angle of rotation sensing device for use in any torque transmission device to measure the torque on the torque transmission device and the angle of rotation of the torque transmission device in a non-contact manner. The invention relates also to a torque and angle of rotation measurement method using the non-contact type torque and angle of rotation sensing device.

2. Description of the Related Art

In line with the worldwide trend of environmental protection and energy saving, the utilization rate and popularity of electric bicycles keeps growing. Except the mechanisms used in a regular bicycle, an electric bicycle further comprises a battery, a drive motor, a controller, a torque sensor and other electronic control components. When riding an electric bicycle, the torque sensor of the electric bicycle will measure the rider's pedaling force and provide a corresponding signal to the controller, enabling the controller to control the drive motor output power to the bicycle subject to the detected torque. The greater the rider's pedaling force is, the higher the output power of the drive motor will be. Thus, manpower needed in order to save riding. Thus, an auxiliary power can be automatically provided to drive the electric bicycle, enabling the rider to ride the electric bicycle with less effort.

Many different kinds of torque sensing devices have been created for electric bicycle applications. For example, a strain gauge may be installed in a pedal crank of an electronic bicycle to measure the deflection of the pedal crank, thereby providing an electrical signal indicative of the torque. Alternatively, a strain gauge can be installed in a transmission component of an electronic bicycle to detect tiny deflection of the transmission component during torque transmission, thereby estimating the torque.

U.S. Pat. No. 6,644,135 discloses a torque sensor, entitled "Torque sensor for a bicycle bottom bracket assembly", which comprises an axle supporting member for supporting the axle for rotation around a support axis, and four pressure sensors mounted on the axle supporting member. During rotation of the bottom bracket axle, the torque is directly transmitted to the axle supporting member, causing each pressure sensor to generate a corresponding pressure. The generated pressure is then converted into torque.

The aforesaid conventional torque sensing devices commonly use a strain gage or pressure sensor in direct contact with the mounting location to convert the deflection rate of the structure of the mounting location into torque. However, the structural deflection state of the mounting location varies with the composition of the material of the structure of the mounting location and its manufacturing process, causing the strain gage unable to accurately measure the actual torque value. Furthermore, conventional torque sensing devices commonly have a complicated structure, or will be directly exposed to the outside open air after installation. Therefore, conventional torque sensing devices cannot take into account the installation requirements of simplicity and sense of beauty.

SUMMARY OF THE INVENTION

The present invention has been accomplished under the circumstances in view. It is the main object of the present invention to prove a non-contact type torque and angle of rotation sensing device, which can accurately measure the torque and is easy to install.

To achieve this and other objects of the present invention, a non-contact type torque and angle of rotation sensing device is provided for measuring a torque being applied to rotate a transmission member and the angle of rotation of the transmission member in a first axial direction. The non-contact type torque and angle of rotation sensing device comprises a magnetic member, a plurality of sensing members and a computing unit. The magnetic member is mounted on the transmission member and rotatable with the transmission member by the torque being applied to the transmission member. The magnetic member comprises a first center. Further, the magnetic member is deflectable relative to the transmission member in a predetermined direction in a nonparallel manner relative to the first axial direction to create an amount of deflection between the first center of the magnetic member and the first axial direction of the transmission member during rotation of the transmission member by the applied torque. The sensing members are adapted to commonly detect a magnetic field variation created and to output a respective electrical signal during rotation of the magnetic member. The electrical signals outputted by each two sensing members exhibit a phase difference. The amplitude of each electrical signal is directly proportional to the amount of deflection of the magnetic member. The computing unit is adapted to receive the electrical signals outputted by the sensing members and to compute the amplitudes of the electrical signals, thereby obtaining the value of the torque being applied to the transmission member and the angle of rotation of the transmission member.

In other words, when the applied torque rotates the transmission member, the magnetic member is caused to produce an amount of deflection that is directly proportional to the applied torque, and at the same time, a variation of the magnetic field created by the magnetic member occurs subject to the angle of rotation of the magnetic member. Subject to eccentric rotation of the magnetic member, each sensing member senses the approach of a sine wave to induce an electrical signal (the transverse coordinate of the sine wave is the angle of rotation). Although the electrical signals of the sensing members change subject to the angle of rotation, the amplitude of the sine wave can be accurately estimated at any angle due to the phase difference relationship among the electrical signals provided by the sensing members, and therefore the applied torque can be further estimated.

Further, the transmission member comprises a disc-like holder block. The disc-like holder block comprises an elongated guide portion. The magnetic member comprises a coupling groove accommodating the elongated guide portion. The coupling groove has a width greater than the length of the elongated guide portion.

The non-contact type torque and angle of rotation sensing device further comprises a driving member mounted on the transmission member, comprising a push portion detachably abutted against the magnetic member.

Further, the sensing members are arranged on one same plane and spaced from one another at a predetermined interval.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-4, a non-contact type torque and angle of rotation sensing device 10 in accordance with the present invention is shown mountable on a transmission member 20 that is rotatable by a torque. The transmission member 20 can be a transmission axle of a vehicle, sports equipment or any of a variety of other mechanical mechanisms. In this embodiment, the transmission member 20 is a bottom bracket axle of an electric bicycle that can be rotated around a support axis in a first axial direction 22 when a rider pedals the pedals of the electric bicycle. The transmission member 20 is inserted through a disc-like holder block 24 that has an elongated guide portion 26 protruded from its one side.

The non-contact type torque and angle of rotation sensing device 10 comprises a magnetic member 30 and a plurality of sensing members 40. The magnetic member 30 is ring magnet having a center hole 32 defining a first center 34, an accommodation space 36 radially extended from the center hole 32, and an elongated groove 38 located on one side thereof and facing toward the disc-like holder block 24. The elongated groove 38 has a width greater than the length of the elongated guide portion 26. Alternatively, the elongated groove 38 can be made in the form of a slot cut through the two opposite sides of the magnetic member 30.

Figure 1:
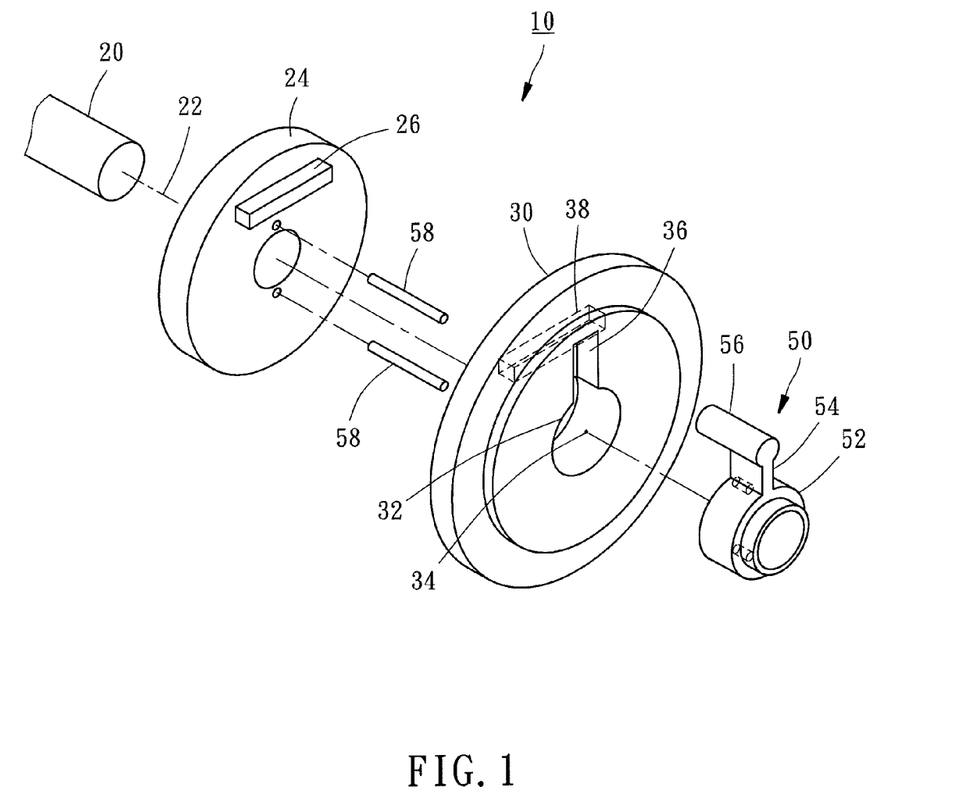
FIG. 1 is an exploded view of a non-contact type torque and angle of rotation sensing device in accordance with the present invention.
Figure 2:
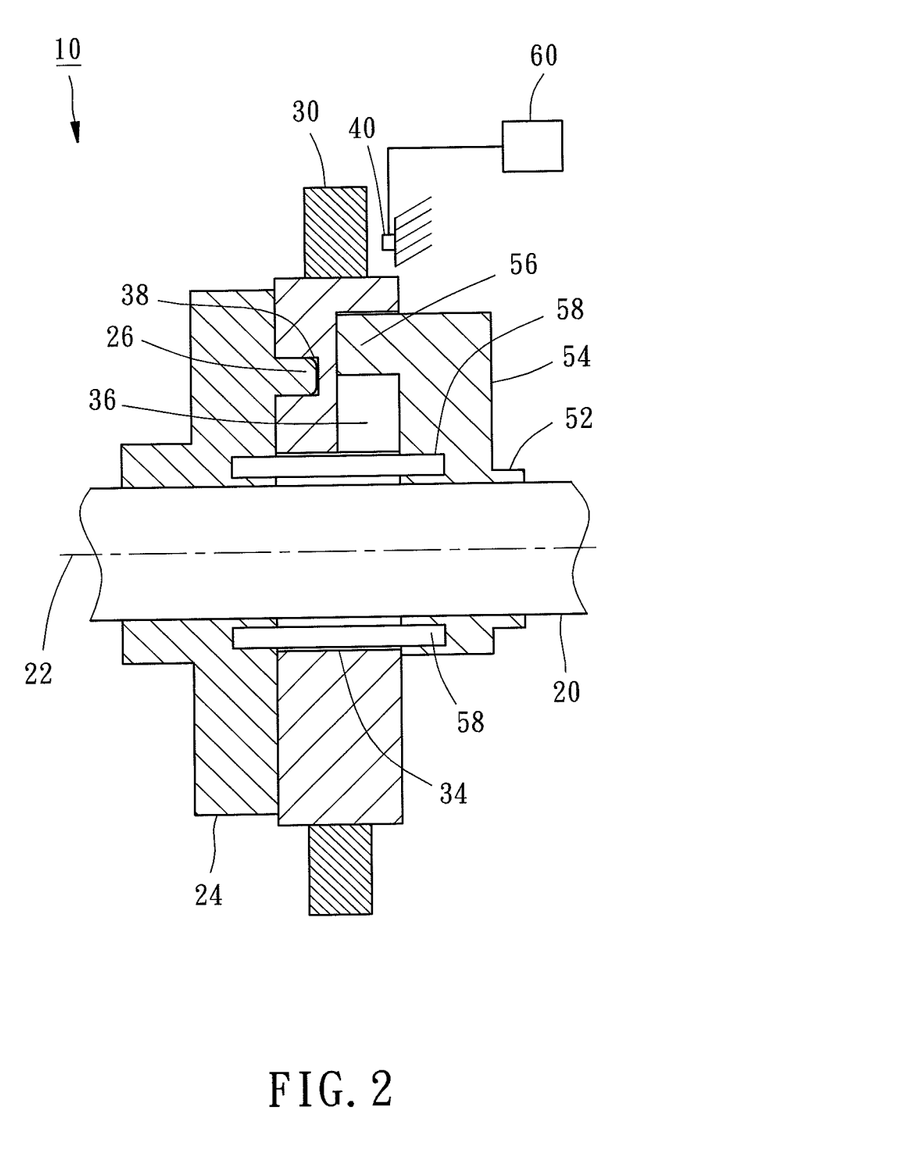
FIG. 2 is a sectional assembly view of the non-contact type torque and angle of rotation sensing device in accordance with the present invention.
Figure 3:
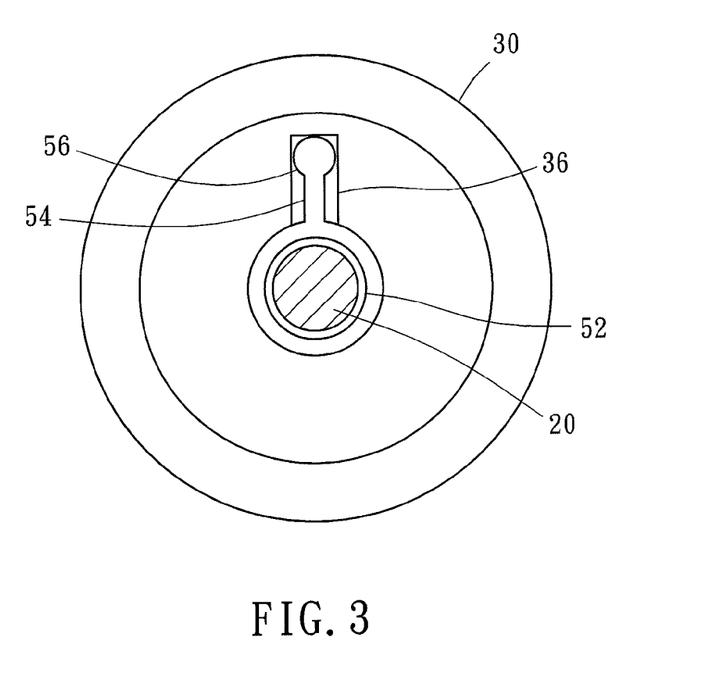
FIG. 3 is a front view of the non-contact type torque and angle of rotation sensing device in accordance with the present invention before rotation of the magnetic member.
Figure 4:
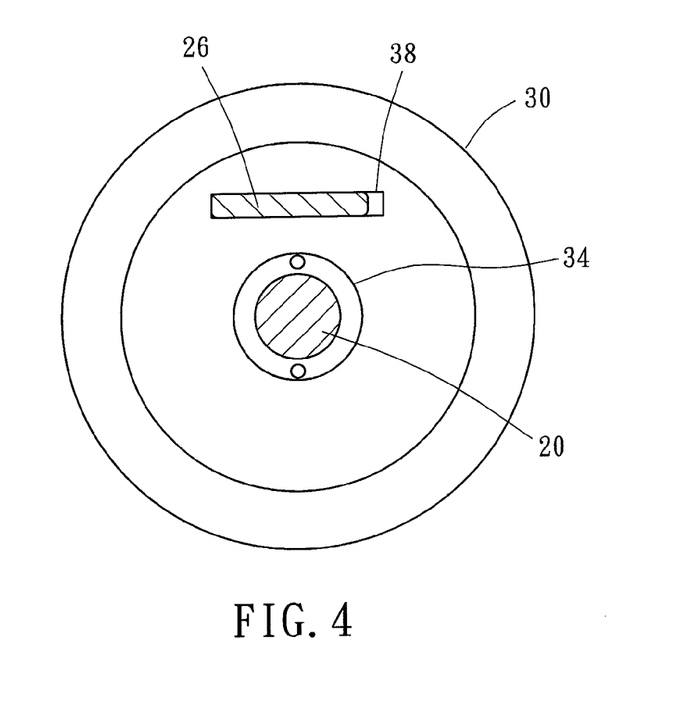
FIG. 4 is a rear side view of FIG. 3 where only the magnetic member and the transmission member are shown.

The transmission member 20 is inserted through the center hole 32 of the magnetic member 30 and attached with its one side to the disc-like holder block 24 to have the elongated guide portion 26 be accommodated in the elongated groove 38. Further, a driving member 50 is mounted on the transmission member 20 at the other side of the magnetic member 30.

The driving member 50 comprises a coupling ring 52 sleeved onto one end of the transmission member 20, an extension portion 54 extended from the outer perimeter of the coupling ring 52 and suspending in the accommodation space 36, and a push portion 56 located on the distal end of the extension portion 54 and stopped against the peripheral wall of the accommodation space 36. Further, two flexible connection rods 58 are inserted through the center hole 32 and connected between the coupling ring 52 and the disc-like holder block 24.

Figure 5:
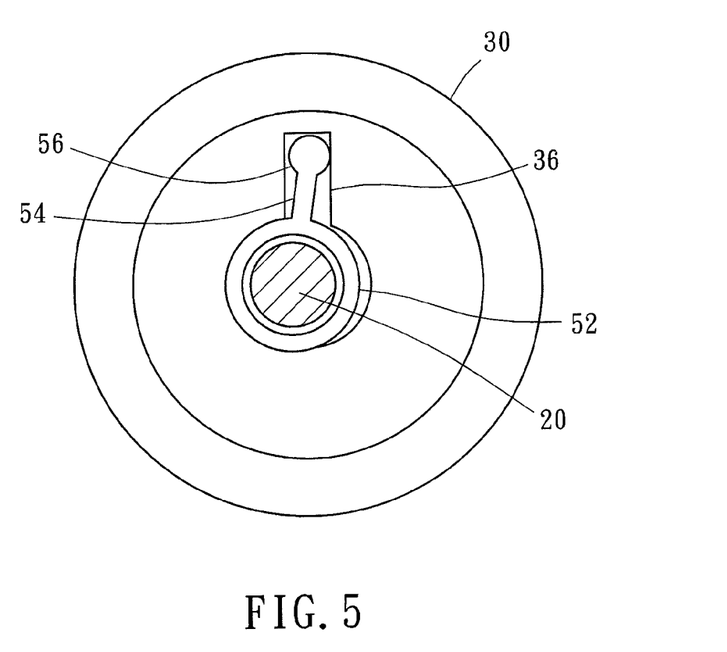
FIG. 5 is similar to FIG. 3, illustrating the magnetic member deflected relative to the transmission member.
Figure 6:
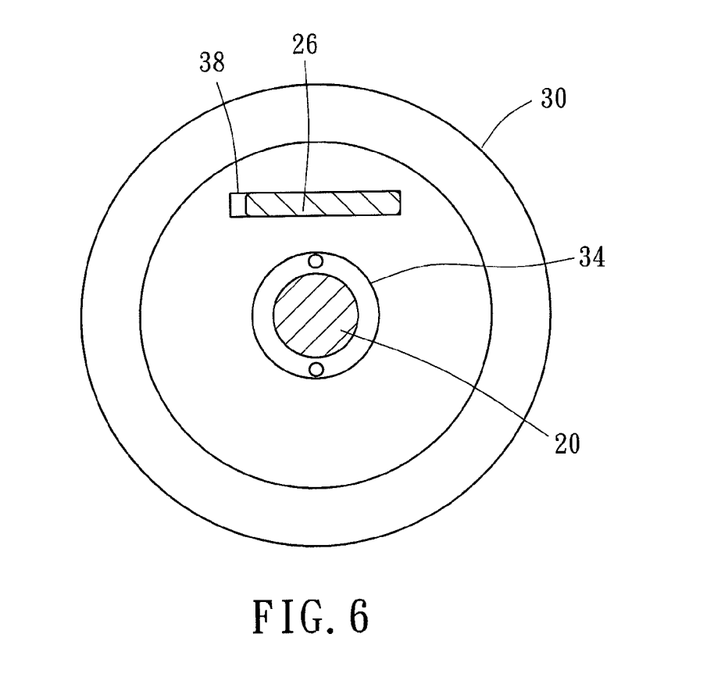
FIG. 6 is a rear side view of FIG. 5 where only the magnetic member and the transmission member are shown.
Figure 7:
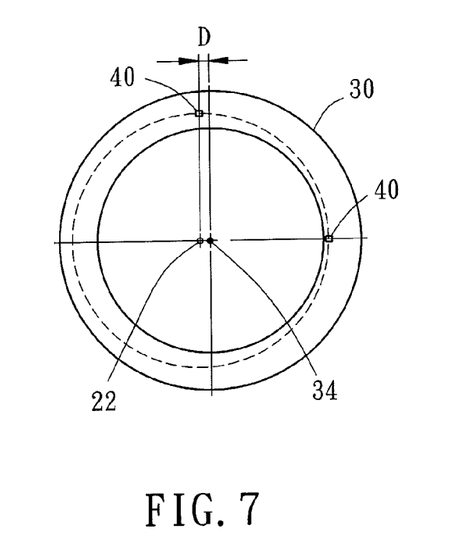
FIGS. 7-10 are schematic drawings illustrating eccentric rotation of the magnetic member.
Figure 8:
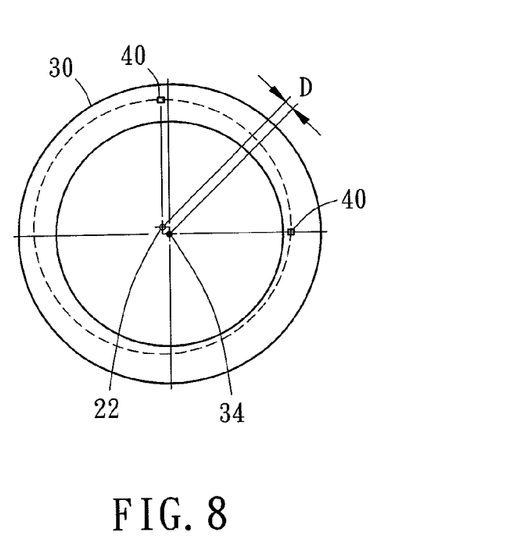
Figure 9:
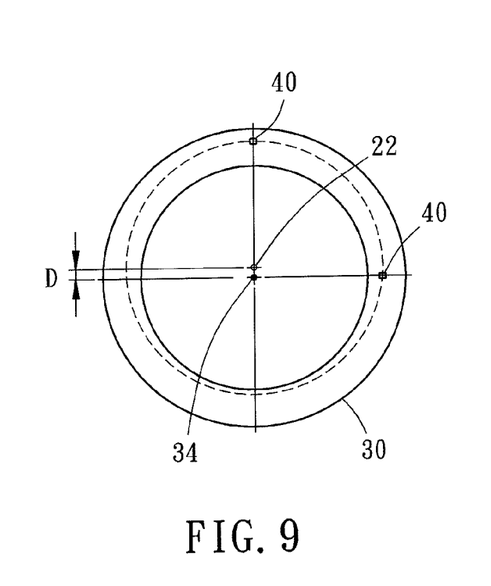
Figure 10:
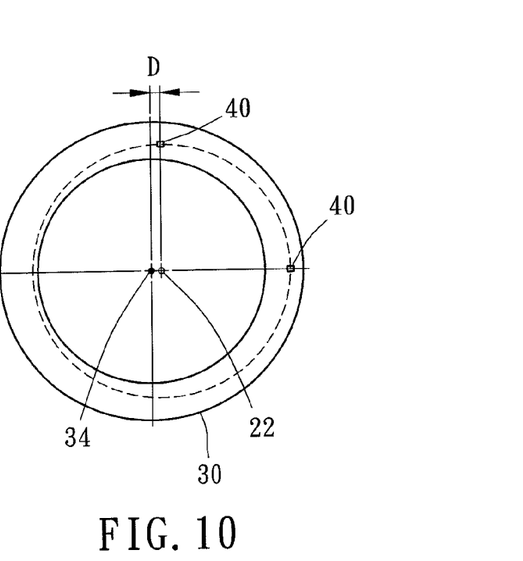

Thus, the driving member 50 and the corresponding one end of the transmission member 20 are rotated by a torque produced during pedaling of the bicycle rider, the other end of the transmission member 20 can then be forced to rotate the chain wheel (not shown). As illustrated in FIGS. 5 and 6, the push portion 56 of the driving member 50 is stopped against the magnetic member 30 and the flexible connection rods 58 are connected between the driving member 50 and the disc-like holder block 24, and therefore the magnetic member 30 and the disc-like holder block 24 are simultaneously rotated during rotation of the transmission member 20. Under the effect of the torque, the driving member 50 and the disc-like holder block 24 twist the two flexible connection rods 58, causing a deflection between the driving member 50 and the disc-like holder block 24. At this time, the magnetic member 30 rotates with the transmission member 20 and deflects relative to the transmission member 20 in a direction along the elongated guide portion 26 in a nonparallel manner relative to the first axial direction 22. According to this embodiment, the magnetic member 30 moves a direction perpendicular to the first axial direction 22, resulting in an amount of deflection D between the first center 34 of the magnetic member 30 and the first axial direction 22 of the transmission member 20. This amount of deflection D is directly proportional to the torque.

The sensing members 40 can be Hall sensors or giant magnetoresistive (GMR) sensors. As shown in FIG. 2 and FIGS. 7-10, two sensing members 40 are arranged adjacent to the magnetic member 30. According to the present preferred embodiment, these two sensing members 40 are mounted on the inside wall of the bottom bracket axle of an electric bicycle on one same plane at a predetermined interval, for example, the these two sensing members 40 are kept apart at 30°, 45°, 60° or 90° angle. These two sensing members 40 are adapted to sense the magnetic field variation during rotation of the magnetic member 30 with the transmission member 20 and to output a respective electrical signal indicative of the sensed magnetic field variation to a computing unit 60. The aforesaid magnetic field variation is directly proportional to the amount of deflection D, i.e., directly proportional to the torque being applied to the transmission member 20. Upon receipt of the electrical signals from the sensing members 40, the computing unit 60 converts the electrical signals into digitals by means of a formula built therein, and then composes the digitals thus obtained into a waveform curve.

Figure 11:
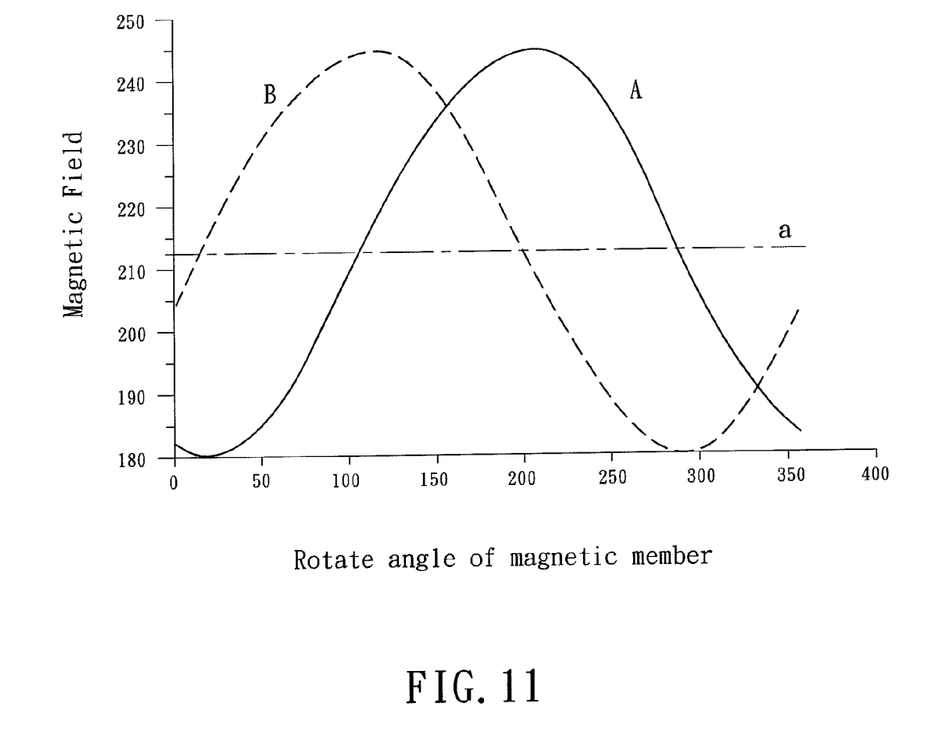
FIG. 11 is a magnetic field variation curve chart obtained from the magnetic member of the non-contact type torque and angle of rotation sensing device in accordance with the present invention.

As stated above, when the magnetic member 30 is being forced by a torque to produce an amount of deflection D that is directly proportional to the applied torque, the magnetic member 30 is rotated with the transmission member 20 in an eccentric manner. Because the two sensing members 40 are immovable, the distance between the magnetic member 30 and each sensing member 40 will be alternatively increased and reduced subject to change of the angle of rotation during rotary motion of the magnetic member 30 on the first axial direction 22. Thus, as shown in FIG. 11, the electrical signals provided by the two sensing members 40 subject to the variation of the magnetic field created by the magnetic member 30 can be converted into near-sinusoidal waveforms of curve A and curve B with a predetermined phase difference therebetween. If the magnetization of the magnetic member 30 is more symmetrical, the curves A;B shown in FIG. 11 will be more closer to sine waves. The amplitude of the sine waves is directly proportional to the amount of deflection of the magnetic member 30. The greater the amount of eccentricity is, the greater the amplitude will be. If the amount of deflection is zero, the amplitude will also be zero.

The invention mainly uses two sensing members 40 to detect the variation of the magnetic field created by the magnetic member 30 and then to create two sine wave curves A;B that have a phase difference therebetween. Subject to the amplitude of these two curves A;B, the torque value is calculated. In one example of the present invention where the two sensing members 40 are kept apart at 90° angle, the torque value τ of the transmission member 20 can be calculated subject to the following Formula (I). In Formula (I), a represents electrical signal mean value that is the mean value obtained through one run (360°) of rotation of the transmission member 20 and can be obtained in the pre-calibration; the constant of proportionality k can be obtained by applying a predetermined torque to the transmission member and then measuring the sine wave amplitude.

$$\tau = kx = k\sqrt{(s_1-a)^2 + (s_2-a)^2} \quad \text{(I)}$$

τ: Torque
k: Constant of proportionality
x: Amplitude
$s_1, s_2$: Electrical signal value of each sensing member
a: Electrical signal mean value Subject to the aforesaid technical features, the transmission member 20 and the magnetic member 30 are both to withstand the applied torque and the sensing members 40 do not touch the transmission member 20, and therefore, the amount of deflection of the magnetic member 30 is directly related to the amount of the applied torque without causing any change subject to the material properties of the transmission member 20 or the other related components. Thus, the measurement result of the present invention is direct and more sensitive than prior art techniques. Further, by means of using at least two sensing members 40 to detect the magnetic field variation of the magnetic member 30 and to create two sine wave curves A;B that have a phase difference therebetween, and then putting the amplitude of each of the two sine wave curves A;B into the aforesaid trigonometric functions of the aforesaid Formula (I) to calculate the amount of deflection of the magnetic member in a complementary manner and to further estimate the actual torque value, the invention accurately estimates the applied torque.

Further, the structural design and mounting arrangement of the magnetic member 30 and the sensing member 40 can be changed to fit different application requirements. Even for use in a narrow space inside a bottom bracket axle of a bicycle, or for application to fit the outer appearance of a product or to match with the positioning of a power source, the non-contact type torque and angle of rotation sensing device of the present invention can be conveniently adjusted and installed for high-performance sensing application.

Further, when four sensing members are equiangularly arranged around the magnetic member, the measurement result will be more accurate. Further, except for the purpose of torque measurement, the invention can also measure the angle and speed of rotation of the transmission member. For this application, two sensing members are used to detect the magnetic field variation of the eccentric rotation of the transmission member and to provide a respective sine wave signal, and then to calculate the turning angle θ of the transmission member using the following Formula (II).

$$\theta = \tan^{-1}(s_1-a)/(s_2-a) \quad \text{(II)}$$

Thus, using the technical features of the aforesaid magnetic member and sensing members, the objects of the invention can thus be achieved.

Further, it is to be understood that the components and applications disclosed above are simply examples for easy understanding of the spirit and scope of the invention but not intended to limit the scope of the invention. Various modifications and enhancements can be made thereunto without departing from the spirit and scope of the invention. For example, the invention can also be used in electric vehicles or electric tools. Accordingly, the invention is not to be limited except as by the appended claims.

What is claimed is:

1. A non-contact type torque and angle of rotation sensing device for measuring a torque being applied to rotate a transmission member and the angle of rotation of said transmission member in a first axial direction, the non-contact type torque and angle of rotation sensing device comprising:
   a magnetic member mounted on said transmission member and rotatable with said transmission member by the torque being applied to said transmission member, said magnetic member comprising a first center, said magnetic member being deflectable relative to said transmission member in a predetermined direction in a nonparallel manner relative to said first axial direction to create an amount of deflection between said first center of said magnetic member and said first axial direction of said transmission member during rotation of said transmission member by the applied torque;
   a plurality of sensing members adapted to commonly detect a magnetic field variation created and to output a respective electrical signal during rotation of said magnetic member, the electrical signals outputted by each two said sensing members indicating a phase difference, the amplitude of each said electrical signal being directly proportional to the amount of deflection of said magnetic member; and
   a computing unit adapted to receive the electrical signals outputted by said sensing members and to compute the amplitudes of said electrical signals, thereby obtaining the value of the torque being applied to said transmission member and the angle of rotation of said transmission member.

2. The non-contact type torque and angle of rotation sensing device as claimed in claim 1, wherein said transmission member comprises a disc-like holder block, said disc-like holder block comprising an elongated guide portion; said magnetic member comprises a coupling groove accommodating said elongated guide portion, said coupling groove having a width greater than the length of said elongated guide portion.

3. The non-contact type torque and angle of rotation sensing device as claimed in claim 1, further comprising a driving member mounted on said transmission member, said driving member comprising a push portion detachably abutted against said magnetic member.

4. The non-contact type torque and angle of rotation sensing device as claimed in claim 2, further comprising a driving member mounted on said transmission member and at least one flexible connection rod connecting said driving member to said disc-like holder block, said driving member comprising a push portion detachably abutted against said magnetic member.

5. The non-contact type torque and angle of rotation sensing device as claimed in claim 1, wherein said sensing members are arranged on one same plane and spaced from one another at a predetermined interval.

6. The non-contact type torque and angle of rotation sensing device as claimed in claim 5, wherein the predetermined interval between each two said sensing members is 90° angle.

7. A measurement method using the non-contact type torque and angle of rotation sensing device as claimed in claim 1, comprising the steps of:

a. applying a torque to said transmission member, causing said magnetic member to rotate with said transmission member and to produce an amount of deflection and a magnetic field variation;
b. using said sensing members to measure said magnetic field variation and to output a respective electrical signal indicative of a respective waveform curve; and
c. using a trigonometric functional equation to calculate the angle of rotation and the amplitude of each said electrical signal and then to translate the calculated angle of rotation and amplitude into the value of the torque being applied to said transmission member.

* * * * *